United States Patent
Marra et al.

(10) Patent No.: US 6,626,034 B2
(45) Date of Patent: Sep. 30, 2003

(54) CONVENTIONAL BRAKE PIPE CONTINUITY TEST

(75) Inventors: Jon Marra, Henderson, NY (US); Dale R. Stevens, Adams Center, NY (US); Kevin B. Root, Black River, NY (US); Roger B. Lewis, Stem, NC (US); John W. LaDuc, Harrisville, NY (US); Patrick S. Lacombe, Watertown, NY (US)

(73) Assignee: New York Air Brake Corporation, Watertown, NY (US)

(*) Notice: Subject to any disclaimer, the term of this patent is extended or adjusted under 35 U.S.C. 154(b) by 101 days.

(21) Appl. No.: 09/823,978

(22) Filed: Apr. 3, 2001

(65) Prior Publication Data
US 2002/0139181 A1 Oct. 3, 2002

(51) Int. Cl.[7] .............................................. G01M 15/00
(52) U.S. Cl. ......................................... 73/121; 73/129
(58) Field of Search ...................... 73/121–129; 303/3, 303/7, 86

(56) References Cited

U.S. PATENT DOCUMENTS

| 4,553,723 A | 11/1985 | Nichols et al. |
|---|---|---|
| 4,582,280 A | 4/1986 | Nichols et al. |
| 6,375,276 B1 * | 4/2002 | Delaruelle ............... 303/7 |

* cited by examiner

Primary Examiner—Eric S. McCall
Assistant Examiner—Monica D. Harrison
(74) Attorney, Agent, or Firm—Barnes & Thornburg

(57) ABSTRACT

The method includes reducing pressure of a charged brake pipe to a predetermined pressure value. The brake pipe is then charged only from the head end unit. Each intermediate brake pipe monitoring and charging device sequentially reports on the network a pressure which is an increase if the brake pipe is continuous between it and the head end unit. Subsequent to receipt of a report of an increased pressure on the network from an intermediate unit, the head end unit commands that intermediate unit to participate in charging the brake pipe. The head end unit determines the brake pipe continuity from the pressure increases reported by the intermediate units.

17 Claims, 1 Drawing Sheet

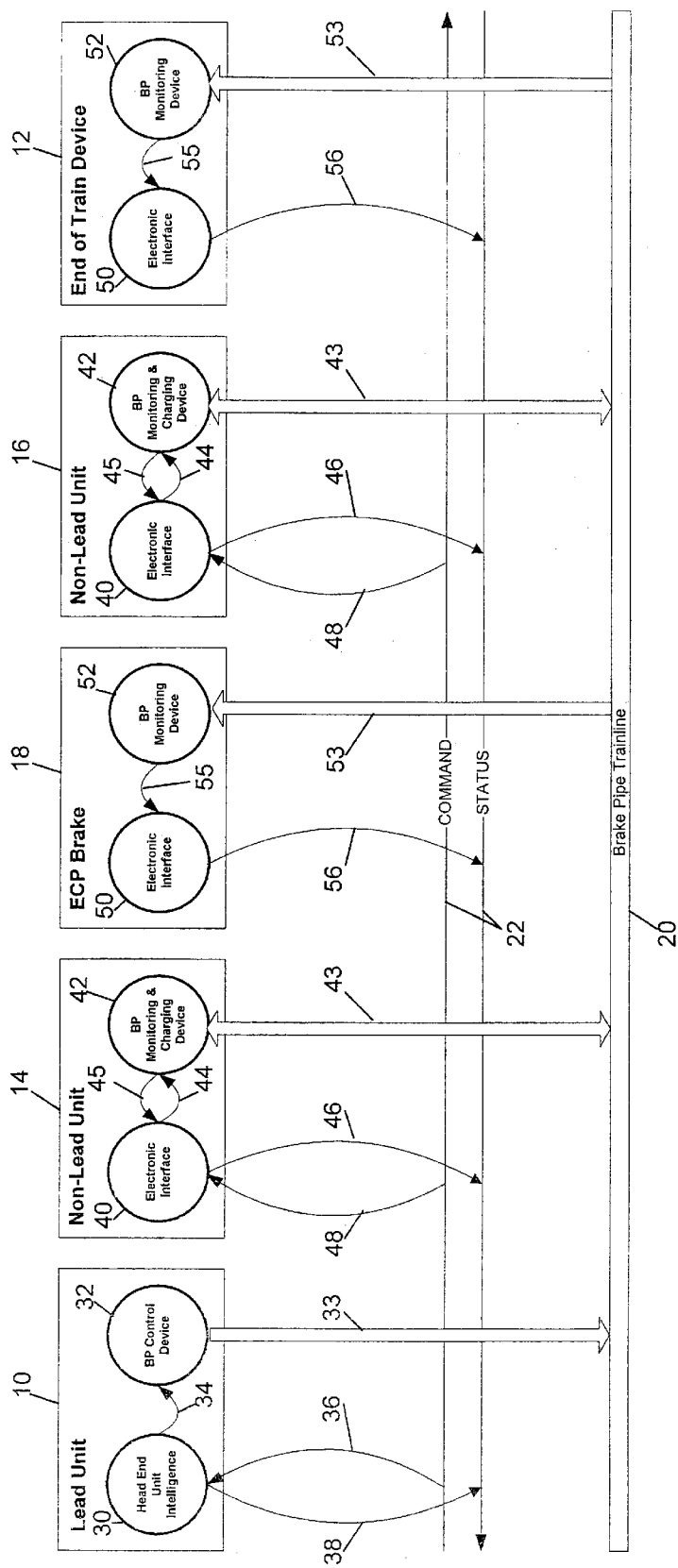

CONVENTIONAL BRAKE PIPE CONTINUITY TEST

BACKGROUND AND SUMMARY OF THE INVENTION

The present invention relates to pneumatic continuity testers and more specifically to a pneumatic continuity tester on an electrically controlled pneumatic train brake system.

The brake pipe continuity between the head end unit and the end of train unit must be checked before a train can leave the yard. This method has included connecting the train brake to a source of external air, charging the brake pipe and determining at the end of train whether it received and maintains the charge. With the addition of the end of train device which includes a radio and pressure sensor that can report the pressure at the end of train, an engineer standing at the beginning of the train can pressurize the train brake pipe using the charging system at the head end and monitor the pressure at the end of train device. In both of these types of tests, if the end of train device does not monitor the appropriate pressure, there is a disruption in the brake pipe and the crew would have to walk the train to determine where the continuity of the brake pipe has been interrupted.

For long trains, there may be more than one locomotive distributed throughout the train. Each locomotive is equipped with charging equipment and a controller. Thus, each locomotive can control the brake pipe and monitor the continuity locally. These type of systems require that the locomotive have a continuity testing capability in addition to a charge capability. This would make the ability to perform the continuity test dependent on the equipment on the individual locomotives. With the advent of electrically controlled pneumatic brakes, ECP, each brake system on the car would include a pressure sensor and a communication device on the network capable of commuting to a head end unit or locomotive. Thus, multiple pressure sensors are available throughout the train between the head end unit and the end of train device.

The present invention takes advantage of the electrically controlled pneumatic brake system on the train to provide a method of determining brake pipe continuity independent of the capability of other units within the train to determine continuity. The system determines continuity from a head end unit to an end of train unit using a plurality of intermediate brake pipe monitoring and charging devices, all connected in a network with the head end unit end of train unit. The method includes reducing pressure of a charged brake pipe to a predetermined pressure value. The brake pipe is then charged only from the head end unit. Each intermediate brake pipe monitoring and charging device sequentially reports on the network a pressure which is an increase if the brake pipe is continuous between it and the head end unit. Subsequent to receipt of a report of an increased pressure on the network from an intermediate unit, the head end unit commands that intermediate unit to participate in charging the brake pipe. The head end unit determines the brake pipe continuity from the pressure increases reported by the intermediate units. The brake pipe pressure at the end of train device is monitored and reported to the head end unit. The initial charging of the brake pipe uses the head end unit and some, if not all of the intermediate units.

There is a dwell period of time between the brake pipe reduction and the charging with the head end unit only. A plurality of brake pipe monitors are also provided between the head end unit and the end of train device on the network and each reports brake pipe pressure on the network. The head end unit can also develop a brake pipe signature from the reported pressure increases.

Other objects, advantages and novel features of the present invention will become apparent from the following detailed description of the invention when considered in conjunction with the accompanying drawings.

BRIEF DESCRIPTION OF THE DRAWINGS

The FIGURE is an electrical pneumatic schematic of a train illustrating brake pipe continuity test method of the present invention.

DETAILED DESCRIPTION OF THE PREFERRED EMBODIMENT

A train is illustrated in the FIGURE and includes a head end unit 10 and an end of train unit 12. A plurality of intermediate non-lead units or locomotives 14 and 16 are shown as well as brake pipe pressure monitoring station 18 (illustrated as an ECP brake). The locomotives or units 10, 14 and 16, end of train device 12 and pressure monitor station 18 are all connected to the brake pipe 20 and are in a network 22 illustrated by the command and status lines. These command and status lines are not separate lines in the network, but are functional lines for the purpose of illustration. The network 22 may be a cable network which includes power as well as communication or may be individual lines for power and communication. It may also use radio communication. The referred network accepted by the American Association of Railroad is Lonworks, although other networks may be used.

The lead or head end unit 10 includes a head end unit intelligence 30 providing controls via 34 to a brake pipe controller 32. The brake pipe controller 32 is connected to the brake pipe 20 via 33. The head end intelligent unit 30 provides network commands via 38 and receives status via line 36 on the network 22. The brake pipe controller 32 receives commands via 34 from the head end unit 30 and controls charging and discharging of the brake pipe 20. It includes its own internal brake pipe sensor such that it knows that it has charged or discharged the brake pipe to the appropriate pressure.

The non-lead intermediate units 14 and 16 may be locomotive displaced throughout the train and each includes an electric interface 40 providing commands to a brake monitoring and charging device 42 via 44 and receives brake pipe signals from the brake pipe monitoring charging device 42 via 45. The brake pipe monitoring charging device 42 monitors the brake pipe pressure from brake pipe 20 via 43 and is capable of charging the brake pipe 20. The electric interface 40 provides status on the network at 46 and receives commands on 48.

The end of train device 12 and brake pipe monitoring device 18 includes an electronic interface 50 which receives brake pipe signals from brake pipe monitoring device 52 via 55 which is connected to the brake pipe 20 via 53. The electronic interface 50 provides status reports via 56 to the network 22.

The present method for brake pipe continuity begins with the head end unit 30 by itself or in combination with the non-lead units 14 and 16 charging the brake pipe to a fully charged condition. Next, the head end unit 30 commands via 38 all of the non-lead units 12 and 14 to terminate their local brake pipe charging via 48 and 44 to their brake pipe charging device 42. The electronic interface 40 of the non-lead units 14 and 16 communicate back via 46 a change of status that they have terminated their charging.

Following the verification that the termination of local charging has been executed by each of the non-lead units 14 and 16, the head end unit 10, head end intelligence 30 commands the lead unit brake pipe control 32 via 34 to reduce the brake pipe to a predetermined value via 33. The system then dwells for a period of time to allow the brake pipe 20 to stabilize throughout the train, for example, —120 seconds. This dwell period is variable, dependent on length and volume of the brake pipe 20.

The head end unit intelligence 30 then commands via 34 the brake pipe control 32 only to charge the brake pipe. The head end unit intelligence 30 then monitors the train status information via 36 of the brake pipe rise throughout the train from the status report provided by the electronic interfaces 40 from the head end units 14 and 16 as well as from the end of train device 12 and from electronic interface 50 of station 18. As pressure rises in sequence throughout the brake pipe from each of the status reports, the head end unit intelligence 30 includes that the brake pipe is continuous from the lead unit 10 to the point where the increase in pressure is detected and reported.

After an appropriate pressure increase has been detected and reported to the head end by the one of the non-lead units 14, 16, the head end unit intelligence 30 will then command that non-lead unit 14, 16 to command via 44 its brake pipe monitoring and charging device 42 to assist in charging the brake pipe. This process is continued until the head end unit 10 determines the brake pipe rise in pressure has been reported at each of the non-lead brake pipe charging and monitoring devices 42 as well as in the brake pipe monitoring devices 52 throughout the train. A final check is performed by monitoring the status of the brake pipe monitoring device 52 at the end of train unit 12. With this, the brake pipe has been verified to be continuous from the head end unit 10 to the end of train device 12.

Although the non-lead units 14 and 16 have the capability of charging the brake pipe, no additional intelligence is needed to perform this continuity test. With the plurality of intermediate brake pipe monitors either with or without charging capability report their status, a break in the continuity of the brake pipe can be monitored and limited to a particular section between any two brake pipe pressure sensors. This is all performed at the head end and does not require an engineer to walk the train except to the particular point that has been identified by the software.

The prior art provides similar brake pipe verification processes, but through distributed intelligence, where the head-end unit relies on a compatible decision making processes at the non-lead brake pipe charging/monitoring devices 14 and 16. The uniqueness of this design achieves this function completely through the decision making process contained within the head-end unit 10. With this design, inter-operable issues related to non-lead brake pipe charging/monitoring devices which are not equipped with the required brake pipe verification capability can be used to perform this verification. Through this design, the monitoring of brake pipe pressure is not limited to the non-lead brake pipe charging/monitoring devices. The monitoring of brake pipe pressure status from any/all monitoring devices within the train can also be used to provide a complete trainline brake pipe signature. This brake pipe status information is also enhanced by knowing the order in which the information is received at the head end unit, as well as knowing the specific location from which is transmitted in the train.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A method of determining brake pipe continuity from a head end unit to an end of train device including a plurality of intermediate brake pipe monitoring and charging devices connected in a network with a head end unit and end of train device, the method comprising:

reducing pressure of a charged brake pipe to a predetermined pressure value;

charging the brake pipe only from the head end unit;

each intermediate brake pipe monitoring and charging device sequentially reporting on the network a pressure which is an increase if the brake pipe is continuous between it and the head end unit;

subsequent to receipt of report of an increased pressure on the network from an intermediate unit, the head end unit commands the reporting intermediate unit to charge the brake pipe; and determining brake pipe continuity at the head end unit from pressure increase reported by the intermediate units.

2. The method according to claim 1, including monitoring and reporting to the head end unit the brake pipe pressure at the end of train device.

3. The method according to claim 1, including initially charging the brake pipe using the head end and the intermediate units.

4. The method according to claim 3, including commanding each intermediate unit to terminate charging and do not begin reducing the brake pipe until each intermediate unit reports termination of charging.

5. The method according to claim 1, including a dwell period of time between brake pipe reduction and charging with the head end only.

6. The method according to claim 1, including a plurality of brake pipe monitors between the head end unit and the end of train device on the network and each reports brake pipe pressure on the network.

7. The method according to claim 1, including developing a brake pipe signature of the brake pipe from the reported pressure increases.

8. A brake pipe continuity testing apparatus including a train having a head end unit having brake pipe control, a plurality of intermediate units each with brake pipe monitor and control and an end of train device with a brake pipe monitor, all on a network, the testing apparatus comprising software which:

reduces pressure of a charged brake pipe to a predetermined pressure value;

charges the brake pipe only from the head end unit;

each intermediate brake pipe monitoring and charging device sequentially reports on the network a pressure which is an increase if the brake pipe is continuous between it and the head end unit;

subsequent to receipt of report of an increased pressure on the network from an intermediate unit, the head end unit commands the reporting intermediate unit to charge the brake pipe; and determines brake pipe continuity at the head end unit from pressure increase reported by the intermediate units.

9. The apparatus of claim 8, including monitoring and reporting to the head end unit the brake pipe pressure at the end of train device.

10. The apparatus according to claim 8, including initially charging the brake pipe using the head end and the intermediate units.

11. The apparatus according to claim 10, including commanding each intermediate unit to terminate charging and do not begin reducing the brake pipe until each intermediate unit reports termination of charging.

12. The apparatus according to claim 8, including a dwell period of time between brake pipe reduction and charging with the head end only.

13. The apparatus according to claim 8, including a plurality of brake pipe monitors between the head end unit and the end of train device on the network and each reports brake pipe pressure on the network.

14. The apparatus according to claim 8, including developing a brake pipe pressure signature of the brake pipe from the reported pressure increases.

15. A method of determining brake pipe continuity from a head end unit to an end of train device including a plurality of intermediate brake pipe monitoring and charging devices connected in a network with a head end unit and end of train device, the method comprising:

initially charging the brake pipe using the head end and the intermediate units;

reducing pressure of a charged brake pipe to a predetermined pressure value;

charging the brake pipe only from the head end unit;

each intermediate brake pipe monitoring and charging device sequentially reporting on the network a pressure which is an increase if the brake pipe is continuous between it and the head end unit;

subsequent to receipt of report of an increased pressure on the network from an intermediate unit, the head end unit commands the reporting intermediate unit to charge the brake pipe; and determining brake pipe continuity from pressure increase reported by the intermediate units.

16. A method of determining brake pipe continuity from a he ad end unit to an end of train device including a plurality of intermediate brake pipe monitoring and charging devices connected in a network with a head end unit and end of train device, the method comprising:

initially charging the brake pipe using the head end and the intermediate units;

commanding each intermediate unit to terminate charging;

reducing pressure of a charged brake pipe to a predetermined pressure value after each intermediate unit reports termination of charging;

charging the brake pipe only from the head end unit;

each intermediate brake pipe monitoring and charging device sequentially reporting on the network a pressure which is an increase if the brake pipe is continuous between it and the head end unit;

subsequent to receipt of report of an increased pressure on the network from an intermediate unit, the head end unit commands the reporting intermediate unit to charge the brake pipe; and determining brake pipe continuity from pressure increase reported by the intermediate units.

17. A brake pipe continuity testing apparatus including a train having a head end unit having brake pipe control, a plurality of intermediate units each with brake pipe monitor and control and an end of train device with a brake pipe monitor, all on a network, the testing apparatus comprising software which:

initially charges the brake pipe using the head end and the intermediate units;

commands each intermediate unit to terminate charging;

reduces pressure of a charged brake pipe to a predetermined pressure value after each intermediate unit reports termination of charging;

charges the brake pipe only from the head end unit;

each intermediate brake pipe monitoring and charging device sequentially reports on the network a pressure which is an increase if the brake pipe is continuous between it and the head end unit;

subsequent to receipt of report of an increased pressure on the network from an intermediate unit, the head end unit commands the reporting intermediate unit to charge the brake pipe; and determines brake pipe continuity at the head end unit from pressure increase reported by the intermediate units.

\* \* \* \* \*